(12) United States Patent
Patil et al.

(10) Patent No.: US 6,593,089 B2
(45) Date of Patent: *Jul. 15, 2003

(54) ARRAYS WITH MASK LAYERS AND METHODS OF MANUFACTURING SAME

(75) Inventors: Sanjay L. Patil, Woodbury, MN (US); Kurt J. Halverson, Lake Elmo, MN (US); Robin E. Wright, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/909,585

(22) Filed: Jul. 20, 2001

(65) Prior Publication Data

US 2001/0053497 A1 Dec. 20, 2001

Related U.S. Application Data

(62) Division of application No. 09/410,863, filed on Oct. 1, 1999, now Pat. No. 6,395,483.
(60) Provisional application No. 60/152,261, filed on Sep. 2, 1999.

(51) Int. Cl.[7] ............................ C12Q 1/68; G01N 15/06; C12M 1/36
(52) U.S. Cl. ........................ 435/6; 435/7.1; 435/287.2; 435/287.8; 435/288.7; 422/50; 422/68.1
(58) Field of Search ........................ 435/6, 7.1, 287.2, 435/287.8, 288.7; 422/50, 68.1

(56) References Cited

U.S. PATENT DOCUMENTS

| 3,853,467 | A | 12/1974 | Giaever |
| 3,926,564 | A | 12/1975 | Giaever |
| 3,979,509 | A | 9/1976 | Glaever |
| 4,266,108 | A | 5/1981 | Anderson et al. |
| 4,387,156 | A | 6/1983 | Crawford et al. |
| 4,390,343 | A | 6/1983 | Walter |
| 4,649,280 | A | 3/1987 | Holland et al. |
| 4,985,300 | A | 1/1991 | Huang |
| 5,143,854 | A | 9/1992 | Pirrung et al. |
| 5,192,502 | A | 3/1993 | Attridge et al. |
| 5,278,377 | A | 1/1994 | Tsai |
| 5,317,045 | A | 5/1994 | Clark, Jr. et al. |
| 5,445,934 | A | 8/1995 | Fodor et al. |
| 5,446,270 | A | 8/1995 | Chamberlain et al. |
| 5,482,830 | A | 1/1996 | Bogart et al. |
| 5,529,708 | A | 6/1996 | Palmgren et al. |
| 5,541,057 | A | 7/1996 | Bogart et al. |
| 5,830,766 | A | 11/1998 | Attridge et al. |
| 5,867,272 | A | 2/1999 | Stenton |
| 5,910,287 | A | 6/1999 | Cassin et al. |
| 5,916,203 | A | 6/1999 | Brandon et al. |
| 5,925,455 | A | 7/1999 | Bruzzone et al. |
| 6,606,237 |   | 5/2000 | Nygren et al. |
| 6,376,619 | B1 * | 4/2002 | Halverson et al. ....... 525/330.3 |
| 6,395,483 | B1 * | 5/2002 | Patil et al. ................... 422/50 |
| 2002/0015952 | A1 * | 2/2002 | Anderson et al. ............. 435/6 |

FOREIGN PATENT DOCUMENTS

| GB | 2 065 298 A | 6/1981 |
| JP | 63-301988 A | 12/1988 |
| WO | WO94/16803 A | 8/1994 |
| WO | WO 95/11912 A | 5/1995 |
| WO | WO 99/32663 A | 7/1995 |
| WO | WO 99/53319 A3 | 10/1999 |
| WO | WO 99/53319 A2 | 10/1999 |

OTHER PUBLICATIONS

U.S. Ser. No. 09/287,379, entitled "High Density, Miniaturized Arrays and Methods of Manufacturing Same," filed Apr. 7, 1999. Pat. 6376619.
U.S. Ser. No. 09/459,418, entitled "Heat–Relaxable Substrates and Arrays," filed Dec. 9, 1999. Abandoned.
U.S. Ser. No. 09/519,450, entitled "Materials With Silicon–Containing Layers For Use In Miniaturized Arrays and Methods of Manufacturing," filed Mar. 5, 2000.

* cited by examiner

*Primary Examiner*—Gary Benzion
*Assistant Examiner*—Jeanine Goldberg
(74) *Attorney, Agent, or Firm*—Christopher D. Gram; James A. Rogers; Robert W. Sprague

(57) ABSTRACT

The present invention provides high-density arrays including mask layers and methods of manufacturing the same. The arrays are formed on a polymeric substrate and include a mask layer. Various linking agents, linking agent coatings, and/or reactants may be provided on the mask layer. Where present, the linking agents and reactants preferably operate together to capture a desired analyte which can then be detected based on an electromagnetic signal, e.g., fluorescence, that is emitted by the analyte in response to excitation energy incident on the array. With the mask layer in place, the signal-to-background ratio provided by the arrays can be increased.

13 Claims, 7 Drawing Sheets

ARRAYS WITH MASK LAYERS AND METHODS OF MANUFACTURING SAME

RELATED APPLICATIONS

This application is a divisional of U.S. patent application Ser. No. 09/410,863, filed Oct. 1, 1999, now U.S. Pat. No. 6,395,483, which claims the benefit of U.S. Provisional Application Ser. No. 60/152,261, filed Sep. 2, 1999.

FIELD OF THE INVENTION

This invention relates to high-density arrays on polymeric substrates and, more particularly, to high-density arrays including mask layers and methods of manufacturing the same.

BACKGROUND OF THE INVENTION

Arrays may be used in a variety of applications, such as gene sequencing, monitoring gene expression, gene mapping, bacterial identification, drug discovery, and combinatorial chemistry. Many of these applications involve expensive and oftentimes difficult to obtain samples and reagents. Accordingly, high density, miniaturized arrays are desirable because the use of such arrays may dramatically increase efficiency with respect to limited or expensive samples when compared to standard arrays, such as a 96 well plate. For example, a 96 well plate may require several hundred microliters of sample per well to run a diagnostic experiment whereas a miniaturized array would require only a fraction of that sample for the entire array. In addition to the reduction of volume, miniaturization allows hundreds or thousands of tests to be performed simultaneously. Furthermore, a high-density array may be more versatile than a standard array because of the wide variation of chemistries that may be present on a single array.

The arrays are typically used to determine the presence of a desired analyte by detecting an electromagnetic signal, e.g., fluorescence, emitted by the analyte in response to excitation. The excitation may be provided in the form of electromagnetic energy from, e.g., a laser. One potential problem with the arrays is that the electromagnetic energy used to excite the analyte may also excite other materials present in the substrate or other portions of the array, causing them to emit an electromagnetic signal similar to that emitted by the desired analyte. For example, where the array is formed on a polymeric substrate that fluoresces in the same or similar wavelength regions as the analyte, a relatively high background electromagnetic signal can be produced by the substrate that reduces the signal-to-background ratio. A lower signal-to-background ratio can make accurate detection of the desired analyte more difficult.

Another potential problem with the arrays is that the substrate may scatter light. For example, nylon and nitrocellulose membranes commonly used for many arrays are white and suffer tremendously from light scatter when used with optical scanners used for, e.g., fluorescence intensity measurements.

Although glass substrates exhibit low fluorescence and light scatter, glass cannot be used to manufacture arrays in mass production processes (such as continuous web manufacturing) because of its brittleness and low ductility.

SUMMARY OF THE INVENTION

The present invention provides, in some aspects, high-density arrays including mask layers and methods of manufacturing the same. The arrays are formed on a polymeric substrate and include a mask layer. Various linking agents, linking agent coatings, and/or reactants may be provided on the mask layer. Where present, the linking agents and reactants preferably operate together to capture a desired analyte which can then be detected based on an electromagnetic signal, e.g., fluorescence, that is emitted by the analyte in response to excitation energy incident on the array.

In some instances, the mask layer preferably reduces or prevents transmission of the excitation energy through the mask layer to the underlying substrate. In other instances, the mask layer may be used to reduce or prevent the transmission of electromagnetic energy from beneath the analyte, e.g., the substrate, that is similar to the electromagnetic signal emitted by the desired analyte in response to the excitation energy. In either case, with the mask layer in place, the electromagnetic signals emitted from the surface of the array can generally be attributed to excitation of the analyte captured on the array, rather than the underlying substrate or other portions of the array.

The substrates and mask layers used in connection with the high-density arrays also provide for reduction in the surface area of the arrays during manufacturing. The reduced surface area can provide a number of advantages including increases in the binding site density on the array, increases in the optical density of the mask layer (to improve the masking capabilities discussed above), and an undulated surface on the array. The undulated surface can improve reactant density on the surface of the arrays coating, thereby increasing the density of the captured analyte. As a result, accurate detection of the desired analyte captured on the arrays can be significantly improved. It is believed that, in some cases, the signal-to-background ratio obtained using high-density arrays of the present invention can be significantly enhanced, e.g., the signal-to-background ratio can exceed 40 or more.

In one aspect, the present invention provides an article for use in manufacturing an array, the article including a polymeric substrate; a mask layer on the article having a projected surface area and a topographical surface area that is greater than the projected surface area; and linking agents on the mask layer.

In another aspect, the present invention provides an array including a polymeric substrate; a mask layer on the array having a projected surface area and a topographical surface area that is greater than the projected surface area; linking agents on the mask layer; and reactants affixed to the linking agents to form binding sites on the array.

In another aspect, the present invention provides an article including a polymeric substrate and a layer on the article having at least one metal or metallic compound, the layer located on a first major surface of the substrate, wherein the layer has a projected surface area and a topographical surface area that is greater than the projected surface area.

In another aspect, the present invention provides a method of forming an article by providing a polymeric substrate having a first major surface with a first surface area; providing a layer on the first major surface of the substrate, wherein the layer includes at least one metal or metallic compound, and further wherein the layer has a projected surface area and a topographical surface area that are equivalent; and relaxing the substrate to reduce the first surface area after providing the layer thereon, wherein, after relaxing, the topographical surface area of the layer is increased such that it is greater than the projected surface area of the layer.

In another aspect, the present invention provides an article for use in manufacturing an array, the article including a polymeric substrate and a mask layer having ink and linking agents located on the article, wherein the mask layer has a projected surface area and a topographical surface area that is greater than the projected surface area.

In another aspect, the present invention provides an array including a polymeric substrate, a mask layer having ink and linking agents on the array, wherein the mask layer has a projected surface area and a topographical surface area that is greater than the projected surface area; and reactants affixed to the linking agents to form binding sites on the array.

In another aspect, the present invention provides a method of manufacturing an array by providing a polymeric substrate having a first major surface with a first surface area; providing a mask layer on the first major surface of the substrate, the mask layer exhibiting an original optical density for light of selected wavelengths; providing binding sites on the mask layer; and relaxing the substrate to reduce the first surface area after providing the mask layer, wherein the relaxing increases the optical density of the mask layer to a relaxed optical density that is greater than the original optical density for light of selected wavelengths.

These and other features and advantages of the invention are described in more detail below with respect to illustrative embodiments of the invention.

DETAILED DESCRIPTION OF ILLUSTRATIVE EMBODIMENTS OF THE INVENTION

Figure 1:
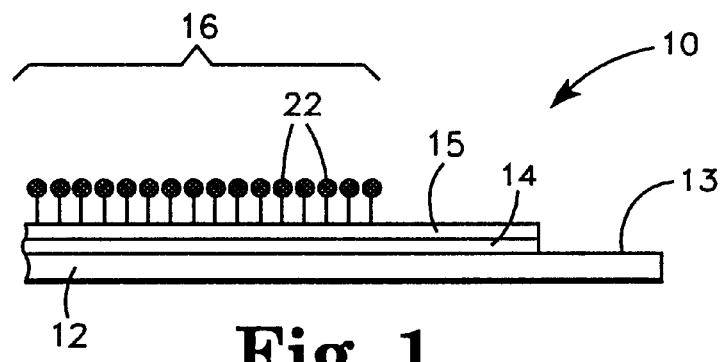
FIG. 1 is side view of an array of the present invention prior to relaxation of the substrate.

In some embodiments, the present invention provides high-density arrays including mask layers and methods of manufacturing the same. In other embodiments, the present invention provides articles with a polymeric substrate including an undulated metal-containing layer having a topographical surface area that is greater than the projected surface area of the article.

The high-density arrays and methods described herein are similar, in some respects, to those described in U.S. patent application Ser. No. 09/287,379 entitled HIGH DENSITY, MINIATURIZED ARRAYS AND METHODS OF MANUFACTURING SAME (filed on Apr. 7, 1999).

For purposes of this invention, the following definitions shall have the meanings set forth.

"Affix" shall include any mode of attaching reactants to a substrate. Such modes shall include, without limitation, covalent and ionic bonding, adherence, such as with an adhesive, and physical entrapment within a substrate. In the case of linking agents, reactants may be affixed to the substrate by linking agents that are created by functionalizing a surface, such as with an acid wash, or by linking agents that are coated on the substrate.

"Analyte" shall mean a molecule, compound, composition or complex, either naturally occurring or synthesized, to be detected or measured in or separated from a sample of interest. Analytes include, without limitation, proteins, peptides, amino acids, fatty acids, nucleic acids, carbohydrates, hormones, steroids, lipids, vitamins, bacteria, viruses, pharmaceuticals, and metabolites.

"Binding site" shall mean a discrete location on a substrate wherein reactants are affixed thereto. A single binding site may include a quantity of one or more of the same reactants affixed to the substrate.

"Density" shall mean a measure of quantity per unit projected area of substrate, such as, for example, linking agents per square centimeter or binding sites per square centimeter.

"Equivalent" shall mean substantially equal.

"Electromagnetic signal" shall mean any electromagnetic radiation or energy (regardless of wavelength/frequency) emitted by a desired analyte in response to excitation energy directed at the analyte.

"Excitation energy" shall mean any electromagnetic radiation or energy (regardless of wavelength/frequency) incident on the array that elicits an electromagnetic signal from the desired analyte.

"Light" shall mean any electromagnetic radiation or energy (regardless of wavelength/frequency) capable of being used for excitation purposes or detected for analysis purposes.

"Linking agent" shall mean any chemical species capable of affixing a "Reactant" to the substrate.

"Mask layer" shall mean a layer that reduces or prevents transmission of light of selected wavelengths.

"Optical density" is determined based on the percent of light transmitted through an article or layer. Optical density (OD) can be determined according to the equation:

$$\text{Optical Density} = \text{Log}(1/\%T)$$

where $\%T$ is the percent transmittance for light of selected wavelengths. For example, an OD of 2 indicates that 1% of the incident light of selected wavelengths is transmitted.

"Projected surface area" shall mean the surface area for a surface as is calculated with respect to the plane encompassing the "x" and "y" axes of the surface.

"Reactant" shall mean any chemical molecule, compound, composition or complex, either naturally occurring or synthesized, that is capable of binding an analyte in a sample of interest either alone or in conjunction with a molecule or compound that assists in binding the analyte to the substrate, such as, for example, a coenzyme. The reactants of the present invention are useful for chemical or biochemical measurement, detection or separation. Accordingly, the term "Reactant" specifically excludes molecules, compounds, compositions or complexes, such as ink, that do not bind analytes as described above. Examples of reactants include, without limitation, amino acids, nucleic acids, including oligonucleotides and cDNA, carbohydrates, and proteins such as enzymes and antibodies.

"Topographical surface area" shall mean the surface area of a surface as is calculated with respect to the planes encompassing the "x", "y" and "z" axes of the surface, or in other words, a measurement of the surface features of the coating.

"Undulations" or "undulated" shall mean convoluted, wave-like forms. For purposes of this invention, it is preferred that an undulated surface comprises undulations that are irregular as to pattern such as are depicted in, e.g., FIGS. 5 and 6. "Undulations" or "undulated" does not include structures such as reservoirs or microwells that are created by methods such as, for example, printing, embossing, casting, molding, laserscribing, photolithography, etching, mechanical scratching or scoring.

With reference to FIG. 1, the present invention 10 includes a substrate 12 with at least one major surface 13 having a surface area. The major surface 13 of the substrate 12 may be generally smooth or may include undulations. The substrate 12 may take any number of shapes. The shape of the substrate 12 is not limiting, so long as the substrate 12 provides a base suitable for the layers and coatings described below.

In addition to the substrate 12, the array 10 also includes a mask layer 14. The mask layer 14 may be provided over substantially all of surface 13 of the substrate 12 or on only a portion thereof.

The array 10 may include a coating 15 including linking agents and reactants 22 thereon, as described more fully below. The linking agents and reactants 22 preferably operate together to capture the desired analyte which can then be detected based on an electromagnetic signal emitted by the analyte in response to excitation energy.

When the excitation energy is incident on the front of the array 10, i.e., the side of the array 10 on which the linking agents and reactants 22 are found, the mask layer 14 may preferably reduce or prevent transmission of the excitation energy to the underlying substrate 12. Alternatively, the mask layer 14 may reduce or prevent transmission of light from the substrate 12 through the mask layer 14 that is similar to the electromagnetic signal produced by the desired analyte in response to the excitation energy. In either case, light emanating from the array 10 in response to the excitation energy that has the characteristics of the electromagnetic signal can generally be attributed to excitation of the analyte captured on the array 10 as discussed below.

As illustrated in FIG. 1, the array 10 may also include a coating 15 that includes linking agents. The linking agents in coating 15 are selected based on the reactants 22 to be affixed to the array 10 and the application for which the array 10 will be used. In the embodiment illustrated in FIG. 1, the linking agent coating 15 is provided on the mask layer 14. It is preferred, but not required, that the linking agent coating 15 be applied over substantially all of the mask layer 14 on the surface 13 of the substrate 12.

Figure 2:
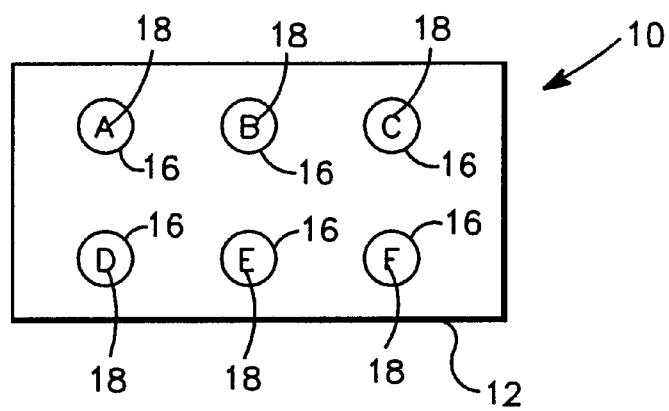
FIG. 2 is a top plan view of an array manufactured in accordance with the methods of the present invention wherein each letter represents a different reactant.

Reactants 22 can be affixed to the array 10 to create binding sites 16 as depicted in FIGS. 1 and 2, where FIG. 2 is top plan view of the front side of the array 10 before relaxation. As described more fully below with respect to the methods of the present invention, any number of processes known in the art may be used to introduce the reactants 22 to be affixed to the linking agent coating 15. The mode of affixation may vary in accordance with the reactant or reactants employed.

The type of reactant 22 used in the present invention will vary according to the application and the analyte of interest. For example, when characterizing DNA, oligonucleotides may be preferred. When conducting diagnostic tests to determine the presence of an antigen, antibodies may be preferred. In other applications, enzymes may be preferred. Accordingly, suitable reactants include, without limitation, amino acids, nucleic acids, including oligonucleotides and cDNA, carbohydrates, and proteins such as enzymes and antibodies.

With reference to FIG. 2, in a preferred embodiment, a variety of nucleic acids, such as oligonucleotides 18 (an oligonucleotide being denoted by a letter) are affixed to the array 10 at separate binding sites 16. The variety of oligonucleotides 18 on the array 10 permits a large number of potential binding events between reactants and target analytes in a sample.

The reactants may be affixed to the binding sites 16 prior to, during or after reduction of the major surface or relaxation of the underlying substrate. However, it is preferred to affix the reactants prior to reduction of the major surface 13 of the substrate 12 through relaxation to take advantage of the methods of the present invention for providing arrays including high reactant binding site densities.

As applied, both the mask layer 14 and the linking agent coating 15 have a projected surface area and a topographical surface area. As applied to the surface 13 of the substrate 12 before relaxation, the composite of the mask layer 14 and the linking agent coating 15 is preferably generally smooth, such that the projected surface area of the masking layer 14/linking agent coating 15 composite and its topographical surface area are substantially equivalent. If the mask layer 14 alone is applied to the substrate 12 before relaxation (without the linking agent coating 15), the projected surface area of the mask layer 14 is also preferably generally smooth, such that its projected surface area is substantially equivalent to its topographical surface area.

Figure 3:
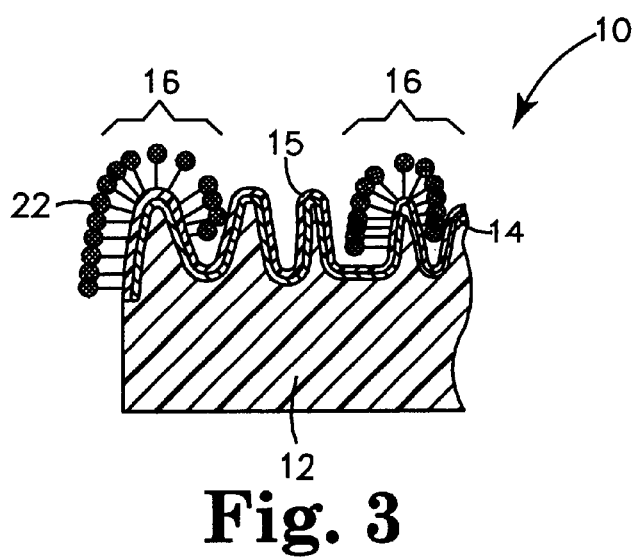
FIG. 3 is a cross-sectional view, after relaxation, of a portion of one array manufactured in accordance with the methods of the present invention.
Figure 4:
FIG. 4 is an SEM of the surface of a titanium-coated substrate before relaxation.
Figure 5:
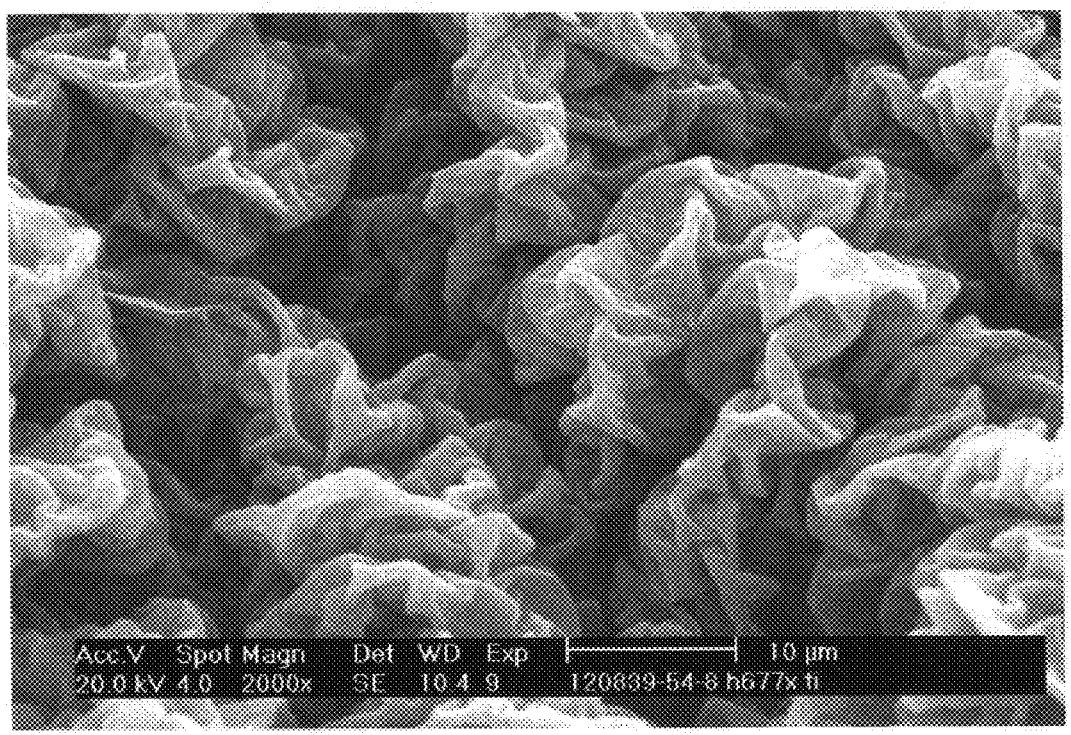
FIG. 5 is an SEM of the surface of a titanium-coated substrate after relaxation.
Figure 6:
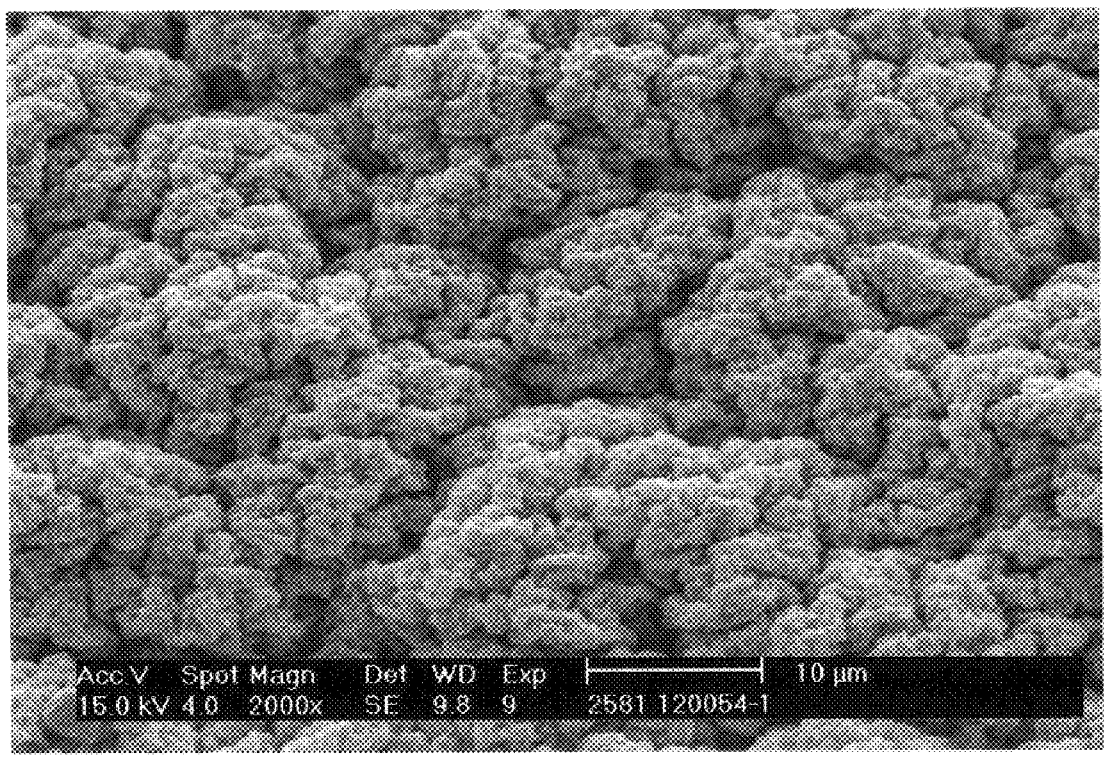
FIG. 6 is an SEM of the surface of a gold-coated substrate after relaxation.

Upon relaxation of the substrate 12, the topographical surface areas of the masking layer 14 alone and the masking layer 14/linking agent coating 15 composite become undulated and are greater than their respective projected surface areas as illustrated in, e.g., FIGS. 3–6. FIG. 3 is a schematic cross-sectional view of the array 10 after relaxation. FIG. 4 is an SEM of a titanium mask layer on a substrate before relaxation where it can be seen that the surface of the mask layer is relatively smooth. FIGS. 5 and 6 are SEM's of mask layers on relaxed substrates using titanium (FIG. 5) and gold (FIG. 6).

As illustrated, the arrays 10 of the present invention are capable of exhibiting topographical surface areas that greatly exceed their projected surface areas. The topographical surface area of the array may be at least two times greater than the projected surface area of the array 10. Preferably, the topographical surface area of the array 10 is at least five times greater than its projected surface area. In a most preferred embodiment, the topographical surface area of the array 10 is at least fifteen times greater than its projected surface area.

It is believed that the increase in topographical surface area of the array 10 is due to a variety of factors, including one or more of the following: the adhesion properties of the mask layer 14 and the underlying substrate 12, the thickness of the mask layer 14 or the mask layer 14/linking agent coating 15 composite, the physical properties (e.g., ductility, malleability, etc.) of the mask layer 14, etc. Upon relaxation of the substrate 12, a stress mismatch may develop at the substrate 12/mask layer 14 interface due to the strain match between the different materials. In any event, the forces involved in relaxing the substrate 12 should be greater than the mechanical properties of the mask layer 14 such that the size of the surface 13 of substrate 12 is reduced and the mask layer 14 or the mask layer 14/linking agent coating 15 composite on that surface 13 is deformed to produce the desired increase in topographical surface area.

The attachment between the mask layer 14 and the substrate 12 should be sufficient to prevent total delamination of the mask layer 14 from the substrate 12. Because the desired array 10 preferably includes an undulated surface, a degree of delamination between the substrate 12 and the mask layer 14 may actually occur and still provide a useful array in accordance with the present invention. However, the degree of delamination of the mask layer 14 from the substrate 12 should not be so great as to interfere with assays being conducted on the arrays or result in effective loss of the mask layer 14 and any coatings thereon from the substrate.

Where the array 10 includes a mask layer 14/linking agent coating 15 composite, the attachment between the linking agent coating 15 and the mask layer 14 should be sufficient to prevent total delamination of the linking agent coating 15 from the mask layer 14. Because the desired array 10 preferably includes an undulated surface, a degree of delamination may actually occur and still provide a useful array in accordance with the present invention. However, the degree of delamination of the linking agent coating 15 from the mask layer should not be so great as to interfere with assays being conducted on the arrays or result in effective loss of the linking agent coating 15 and any materials (e.g., reactants) thereon from the array 10.

Significantly, the use of thermal energy to relax, e.g., an oriented substrate 12, may actually improve adhesion between the mask layer 14 and the substrate 12. It is possible that, due to the undulations, the substrate 12 and the mask layer 14 form an interlocking structure in which the substrate material flows into the structure formed by the mask layer 14 as illustrated in, e.g., FIG. 3. Upon cooling, the interlocking structures may serve to reduce or minimize delamination of the mask layer 14 from the substrate 12. It should, however, also be understood that the surface of the substrate 12 may not form an interlocking structure with the mask layer 14 after relaxation.

One advantage of the undulated surfaces provided by relaxing the substrates with a mask layer located thereon is that the increased surface area may offer additional opportunities for increasing signal strength of the arrays. The undulated surfaces may provide more reactants in a given area as compared to reactant density when the reactants are bound to a relatively flat surface. Also, in the case where reactants are affixed prior to relaxation of the substrate, the spatial relationship of the reactants to one another on the surface is fixed. Upon relaxation of the substrate, the surface of the coating becomes undulated, effect, increasing the density of reactants with respect to the projected surface area but substantially maintaining their relative separation due to the topographical surface area. This spacing allows presentation of a high density of reactants or binding sites at or near the surface of the coating while minimizing potential steric crowding. This, in turn, facilitates rapid interaction kinetics with prospective analytes as well as increased intensity in the electromagnetic signals emitted by the analytes in response to excitation energy.

Substrate Materials/Selection

The substrate 12 of the present invention is preferably a polymeric material. The material of the substrate is selected with regard to the application for the resulting arrays. The substrate material preferably is compatible with the reagents and conditions of the assays, such as temperature and pH.

Many polymeric materials may be suitable for use in the present invention. However, in order to form the high surface area surface of the linking agent coating, as described more fully below, the materials are preferably capable of being oriented, i.e., films that shrink at least in one direction within the film plane when energy, preferably heat, is applied to the film for a specified period of time.

Elastomeric materials are also suitable for use as substrates in the present invention. The elastomeric materials should be stretched and constrained in at least one direction prior to coating and reactant affixation, and then allowed to recover, thereby reducing the projected surface area of the substrate surface from the stretched state.

With respect to oriented films, shrinkage need not be equal in any two orthogonal directions within the film plane, although a substantially uniform shrinkage is preferred. In considering shrinkage as a function of direction in the film plane, substantial uniformity of directionally-dependent shrinkage from point to point within the film is preferred; that is, the film preferably shrinks in substantially the same amount in each direction, regardless of position on the film plane. If the film employed does not exhibit substantially uniform shrink characteristics, a registration indicator may be added to the binding sites or otherwise employed to register the binding sites in the finished array.

While the starting substrate material of the present invention includes oriented films, the substrates of the arrays of the present invention are generally relaxed after manufacturing, i.e., the substrates are generally no longer oriented or, in fact, isotropic. A backing may be applied to the substrate to maintain the substrate in a less than oriented state. The backing may optionally include a release liner to permit the backing to be removed if desired.

Preferred oriented films include biaxially oriented low-density polyethylenes; biaxially oriented linear low-density polyethylenes; and biaxially oriented ultra low-density polyethylenes. Biaxially oriented films are preferred because they exhibit shrinkage in two orthogonal in-plane directions (hereafter referred to as the "x" and "y" directions). Other oriented films that may be suitable for use in the present invention include uniaxially, biaxially, or multiaxially oriented films made by any process known to the art, including but not limited to melt-orientation; the blown film, bubble, double-bubble, and tubular processes; length orientation; the process of tentering; extension over a mandrel; thermoforming; and blow molding.

Polymers which may be employed in substrates of the invention include, but are not limited to, polyethylenes, including high density polyethylene, low density polyethylene, linear low density polyethylene, ultra low density polyethylene, and copolymers of ethylene (including ethylene propylene copolymers and ethylene vinyl acetate copolymers); polyolefins, including isotactic polypropylene, syndiotactic polypropylene, and polymethylpentene; polyacetals; polyamides, including polyamide 6 and polyamide 66; polyesters, including polyethylene terephthalate, polybutylene terephthalate, and polyethylene naphthalate; halogenated polymers, including polyvinyl chloride, polyvinylidene chloride, polychlorotrifluoroethylene, polyvinyl fluoride, and polyvinylidene fluoride; styrene polymers, including general purpose polystyrene and syndiotactic polystyrene; cellulose esters, including cellulose acetate and cellulose propionate; polyketones, including polyetheretherketone and copolymers and terpolymers of carbon monoxide with ethylene and/or propylene; polycarbonates, including the polycarbonate of bisphenol A; phenyl-ring polymers, including polyphenylene sulfide; polysulfones; polyurethanes; polymers of acrylic and methacrylic acids and their esters; ionomers; and copolymers, blends, or layered structures of any of the above-named polymers. Oriented films of any of these polymers may be optionally cross-linked.

Examples of elastomeric materials that may be suitable for use in the present invention include natural rubber, polyisoprenes, polychloroprene, polyisobutylenes, polybutenes, nitrites, polyurethanes, silicones, random copolymers and terpolymers (such as ethylene-propylene copolymers and ethylene-propylene-diene monomer terpolymers), and block copolymers.

Mask Layer

The mask layer materials can be selected based on two characteristics. Those characteristics include the optical density of the mask layer and the ability to form an undulated surface on a relaxed substrate. Like the substrate material, the materials in the mask layer are preferably compatible with the reagents and conditions of the assays, such as temperature and pH.

With respect to optical density, it may be preferred, when used for high density arrays, that the mask layer 14 substantially reduce or prevent transmission of light of selected wavelengths. The reduction in transmission should be significant enough to effectively increase the signal-to-background ratio provided by the resulting array. It may be preferred that, after relaxation, the optical density of the mask layer 14 is about 0.5 or more for light of selected wavelengths, more preferably about 1.0 or more for light of selected wavelengths, still more preferably about 1.5 or more for light of selected wavelengths, and even more preferably about 2.0 or more for light of selected wavelengths. Regardless of the actual optical density of the mask layer 14 (independent of the substrate and any other materials), the pre-relaxation or original optical density of the mask layer 14 is preferably less than the post-relaxation optical density (for light of selected wavelengths).

Optical density of the mask layer 14 can be determined according to the method described in the Test Methods section below. Because the optical density of the mask layer 14 may be wavelength dependent, optical density is described herein in terms of selected wavelengths. Those selected wavelengths may include one or more specific wavelengths or ranges of wavelengths.

The mask layer 14 may, in some instances, transmit light outside of the wavelengths that could significantly negatively affect detection of an electromagnetic signal emitted from an analyte in response to excitation energy incident on the array 10. For example, the mask layer 14 may exhibit an optical density for the excitation energy that is sufficiently high such that little or none of the excitation energy passes through the mask layer to the substrate 12. As a result, the excitation energy is substantially prevented from exciting materials in the array 10 other than the desired analyte.

In one alternative, the mask layer 14 may transmit the excitation energy or a significant portion thereof, but exhibit a relatively high optical density for light in the wavelengths of the electromagnetic signal generated by the desired analyte as bound to the array in the assaying technique. In other words, any electromagnetic signal, e.g., fluorescence, that could be attributed to the substrate's interaction with the excitation energy would be substantially blocked from transmission to a detector located above the front side of the array 10 by the mask layer 14. As a result, the detector would primarily detect the electromagnetic signals generated by excitation of the desired analyte on the array 10.

The optical densities for the mask layer 14 discussed above are for the arrays 10 after relaxation of the substrate 12. It is, however, preferred that the mask layer 14 be provided before the substrate 12 is relaxed. As a result, the original optical density of the mask layer 14 as provided before relaxation of the substrate 12 will typically be lower than the optical density of the mask layer 14 after relaxation of the substrate 12. In other words, relaxation of the substrate 12 may be useful to increase the optical density of the mask layer 14.

In many instances, the mask layer 14 thickness may correlate to original optical density. Likewise, a thicker mask layer 14 (as deposited) may excessively constrain or reduce shrinkage of the substrate 12 during relaxation such that the desired density of binding sites 16 cannot be obtained after relaxation. By providing the mask layer 14 with a lower original optical density and correspondingly lower thickness, the resistance to shrinkage or reduction in the substrate surface area during relaxation will typically be lower as compared to a thicker mask layer 14. As a result, a thinner, less optically dense mask layer 14 may offer improved performance as compared to a thicker mask layer 14 with a higher original optical density.

It is believed that thicker mask layers 14 may result in larger-dimensioned undulations because the flexural rigidity of the mask layer 14 will increase as its thickness increases. In theory, a flexurally stiffer layer would be expected to bend at a larger radius than that of an object of less rigidity (all other variables being equal). In practice, the flexural rigidity will also be affected by the adhesion properties of the mask layer 14 with respect to the substrate 12.

The mask layer 14 may take a variety of different forms. In one embodiment, the mask layer may take the form of a metal-containing coating deposited on the surface 13 of the substrate 12. The metal-containing coating may be formed by any known techniques for depositing metal films on substrates, e.g., vapor deposition, sputtering, etc. Alternatively, any other suitable technique for providing a metal-containing coating on a substrate may be used. For example, mask layer 14 may be provided in the form of a metal-containing matrix formed on the surface 13 of the substrates 12.

A metal-containing mask layer 14 may include one or more metals, one or more metallic compounds, or combinations of one or more metals and one or more metallic compounds. Examples of suitable metals for the mask layer 14 include, but are not limited to, titanium, chromium, tin, gold, iron, platinum, palladium, silver, and combinations of two or more thereof. Metallic compounds may also be used to form the mask layer 14. For example, the mask layer 14 may include one or more metallic oxides, e.g., titanium dioxide, either in place of metals or in addition to metals. In some instances, it may be preferred that the mask layer 14 consist essentially of one or more metals, one or more metallic compounds, or combinations of one or more metals and one or more metallic compounds.

Another alternative for the mask layer 14 is that it may include one or more inks deposited on the surface 13 of the substrate 12. It may be preferred that the ink be in the form of a curable ink, e.g., an ultraviolet curable ink such as a 100% solids ink. The ink or inks used in the mask layer 14 may include pigments, dyes, synthetic resins, metallic particles, and the like (or any combination of these or other materials), provided that the selected wavelengths of light are not transmitted through the mask layer 14 or their transmission is substantially reduced. If the ink includes dyes, they are preferably non-fluorescent or fluorescent at wavelengths that do not interfere with the assay wavelengths relied on to detect the presence of the desired analytes.

In addition, the surface of the substrate 12 may be treated and/or cleaned to improve attachment of the mask layer 14 to the substrate 12. For example, the substrate 12 may be plasma treated (in, e.g., an oxygen environment) or it may be corona treated. Other treatments may also be used. Further, although not specifically illustrated, additional layers may be introduced between the substrate 12 and the mask layer 14, e.g., tie layers, primers, adhesives, etc., to improve attachment of the mask layer to the substrate.

The mask layer 14 may be provided substantially over the entire area of the surface 13 of the substrate 12, or only portions of the surface 13 of the substrate 12 may include a mask layer 14. In one example of a partially-coated substrate, the mask layer may be provided in discrete, discontinuous areas that may be in a regular or irregular pattern on the surface of the substrate. In the latter case, upon relaxation of the substrate, the topographical surface area of each of the areas including the mask layer will be greater than the projected surface area of those areas. Likewise, the optical density of the mask layer in each of the discrete, discontinuous areas may, after relaxation of the substrate, be increased over the original optical densities in those areas.

Although the mask layer 14 is illustrated herein as including a single, homogenous layer, it should be understood that the mask layer 14 may alternatively be provided as two or more sub-layers of the same or different materials.

Linking Agent Coating

A wide variety of linking agent coatings may be suitable for use in the arrays of the present invention, provided the coatings are compatible with the mask layer, are suitable for affixing reactants, and are compatible with the assays and attendant conditions that are to be conducted on the arrays.

A linking agent coating 15 may be provided substantially over the entire area of the surface 13 of the substrate 12, or over only a portion of the surface 13 of the substrate 12. If provided over only a portion of the surface 13, the linking agent coating 15 may be provided in discrete, discontinuous areas that may be in a regular or irregular pattern on such surface. If the mask layer 14 is also provided over only a portion of the surface 13 of the substrate 12, then the linking agent coating 15 may be provided only over those areas covered by the mask layer 14, only over those areas not covered by the mask layer 14, or over both the areas covered by the mask layer 14 as well as those areas that are not covered by the mask layer 14.

Preferred linking agents may be azlactone moieties such as those provided by copolymers as taught in U.S. Pat. Nos. 4,304,705; 4,451,619; 5,262,484; 5,344,701; and 5,403,902. Especially preferred copolymers may be those prepared using hydrophilic or water-soluble comonomers such as acrylamide and acrylamide derivatives, hydroxyethylacrylate and methacrylate, and the like. In addition to azlactone linking agents, copolymers including other linking agents may also be utilized. These include, for example, epoxy, carboxylic acid, hydroxyl, amine, N-hydroxysuccinimide, iso- and isothiocyanate, anhydride, aldehyde, and other groups which are well known in the art for the immobilization of reactants. The copolymers including linking agents may be prepared by either step growth or chain growth polymerization processes as are well known in the art.

Azlactone moieties are preferred because these moieties are suitable for reaction with numerous reactants, including oligonucleotides. Azlactone moieties are generally hydrolytically stable and therefore have a relatively long shelf life when used in applications of the present invention. These moieties also generally exhibit high reactivity with a wide variety of reactants.

The linking agent coatings may be crosslinked or otherwise treated to insolubilize, modify the $T_g$ or modify the adhesion properties of the coating. For example, copolymers that have a low $T_g$ may be formulated with a cross-linker in order to raise the $T_g$ of the resultant coating. The coatings can be applied to the mask layer 14 by any of several conventional techniques known in the art, such as extrusion coating, die coating, dip coating, air-knife coating, gravure coating, curtain coating, spray coating, use of wire wound coating rods, and the like. Coatings may be made from solution, followed by removal of solvent, or by hot melt coating of 100% solids formulations.

Where the articles manufactured according to the present invention include a linking agent coating 15 on the mask layer 14, the linking agent coating 15 preferably has a thickness of at least about 0.1 micron. It may also be preferred that the thickness of the linking agent coating 15 be about 10 microns or less, with a coating of less than about 1 micron being preferred to minimize diffusion difficulties that may arise when using thicker coatings. An analyte of interest may have to diffuse through the coating prior to contacting a reactant affixed thereto. If the linking agent coating 15 is relatively thick, e.g., greater than about 10 microns, the diffusion time required could slow the kinetics of the analyte/reactant interaction. Furthermore, if the coating 15 is too thick, it may delaminate from the mask layer 14 because of the high flexural rigidity of such a coating.

Adhesion of the linking agent coating 15 to the mask layer 14 may be improved, if desired, by any of the methods known to one skilled in the art. These methods include various pre-treatments to or additional coatings on the mask layer 14, such as corona or plasma treatment, or by application of primers. Suitable primers include, without limitation, polyethyleneimine, polyvinylidenechloride, primers such as those described in U.S. Pat. No. 5,602,202, and colloidal dispersions of inorganic metal oxides in combination with ambifunctional silanes such as described in U.S. Pat. Nos. 5,204,219, 5,464,900, and 5,639,546.

It may be desirable that the mask layer 14 and linking agent coating 15 form covalent linkages to secure the linking agent coating to the underlying mask layer. One combination of materials that can provide covalent linkages include a mask layer 14 formed with titanium dioxide and a linking agent coating 15 formed using an aminosilane reagent as the crosslinker in an azlactone linking agent coating. The amine end of the molecule can react with an azlactone linking agent, while the silane group from one molecule can react with a silane group from another molecule to form a cross-link. Some silane groups not involved in cross-linking can react to form covalent linkages with the titanium dioxide in the mask layer 14. Covalent linkages between the mask layer 14 and the linking agent coating 15 may provide particularly robust systems.

Alternatively, a titanium dioxide mask layer 14 can be used with an aminosilane reagent without an azlactone linking agent coating, in which case the silane groups form the covalent linkages with the titanium dioxide in the mask layer 14 while the amine groups in the coating 15 function as linking agents to capture the desired reactants.

Figure 7:
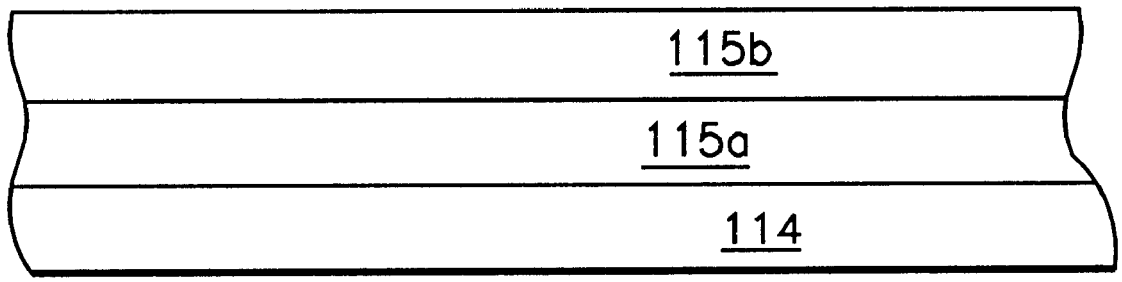
FIG. 7 illustrates an alternative embodiment of the present invention.

Although illustrated as a single, homogenous layer, the linking agent coating 15 may include two or more sub-layers in which linking agents may be present in one or more of the sub-layers that collectively make up the linking agent coating 15. Referring now to FIG. 7, a first sub-layer 115a including linking agents may be overcoated by a second sub-layer 115b including linking agents. The linking agents in the first and second sub-layers 115a and 115b may be the same or different. Preferably, the two sub-layers 115a and 115b would adhere to each other or chemically bond to each other.

For example, the mask layer 114 may be coated with a first polymeric sub-layer 115a including azlactone moieties that, in turn, is overcoated with a second polymeric sub-layer 115b including any positively charged moieties, e.g., amine moieties. If amine moieties are provided in the second sub-layer 115b and azlactones are provided in the first sub-layer 115a, the amine moieties and azlactones would react to covalently bind the sub-layers together. Further, it is anticipated that free positively-charged groups would remain in the second sub-layer 115b to affix reactants, such as cDNA.

It may be preferred that the sub-layers 115a and 115b form covalent bonds and that the reactants form ionic bonds to the positively-charged groups in the second sub-layer 115b for a variety of reasons. Among the reasons, ionic bonds form quicker than, e.g., covalent bonds. In addition, some control over charge density may be obtained. For example, where the second sub-layer 115b includes polyethyleneimine (PEI) for its amine moieties, charge density may be controlled based on, e.g., PEI concentration in the coating or the PEI structure (e.g., the number of amine groups per molecule, etc.). That charge density can affect the reactant density on the surface of the second sub-layer 115b.

Illustrative Methods

The substrates used in connection with the present invention are capable of having their surface areas reduced by relaxation. At least the mask layer materials are preferably applied to the substrate before relaxation. If the substrate is formed of an oriented polymer, then relaxation to reduce the surface area of the substrate will typically be achieved by heating, causing it to relax in at least one direction. If the substrate is elastomeric, it is preferably elongated and constrained in the desired direction or directions before the mask layer is applied on the surface of the substrate. Relaxation will then encompass releasing the elastomeric substrate to allow it to return at least partially to its pre-elongated state.

Figure 8:
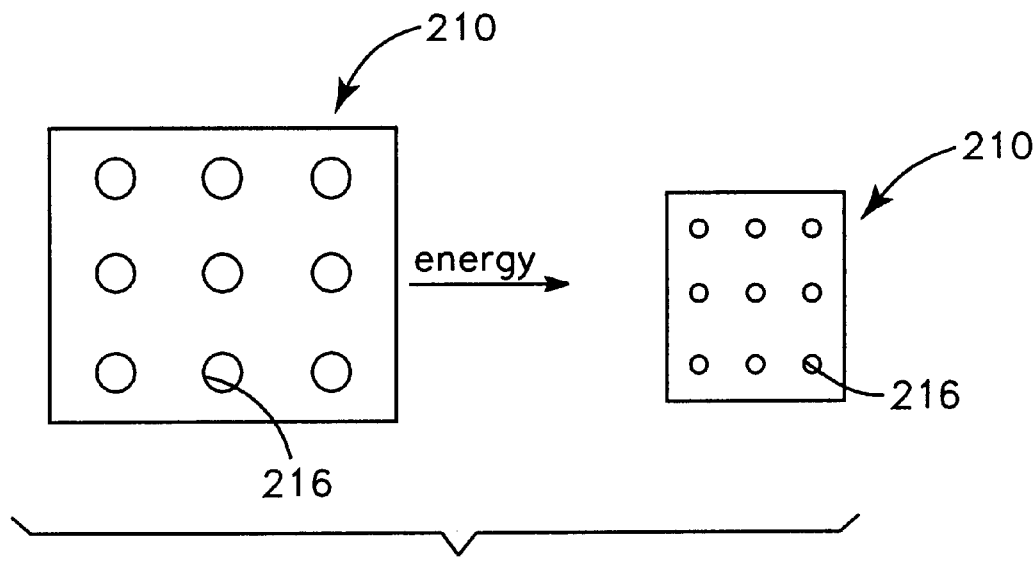
FIG. 8 depicts one illustrative method of the present invention.

Referring now to FIG. 8, one illustrative method of the present invention begins with a substrate starting material that is an at least partially oriented polymeric film. Oriented polymeric films exhibit an area relaxation reduction that is dependent in part on the degree of elongation of the film during orientation thereof. In the methods of the present invention, the area relaxation reduction is a measure of the reduction in surface area of the substrate of the array 210 from its oriented, pre-relaxed dimensions to its dimensions after energy has been applied to relax (e.g., shrink) the substrate of the array 210. For example, an array 210 with a pre-relaxation surface area of 10 cm×10 cm (100 cm$^2$) that shrinks fifty percent (50%) in the "x" direction and fifty percent (50%) in the "y" direction after the application of sufficient heat will be reduced to 5 cm×5 cm (25 cm$^2$ area), thereby exhibiting an area relaxation reduction of seventy-five percent (75%). An area relaxation reduction of about twenty-five percent (25%) is preferable for use in the present invention, with an area relaxation reduction of more than about seventy-five percent (75%) being most preferred because films exhibiting area relaxation reductions of this magnitude are capable of achieving very high-density arrays. The increase in binding site density is also illustrated in FIG. 8 where the spacing between the binding sites 216 decreases as a part of the area relaxation reduction. In addition, the size of each of the binding sites 216 also decreases.

Figure 9:
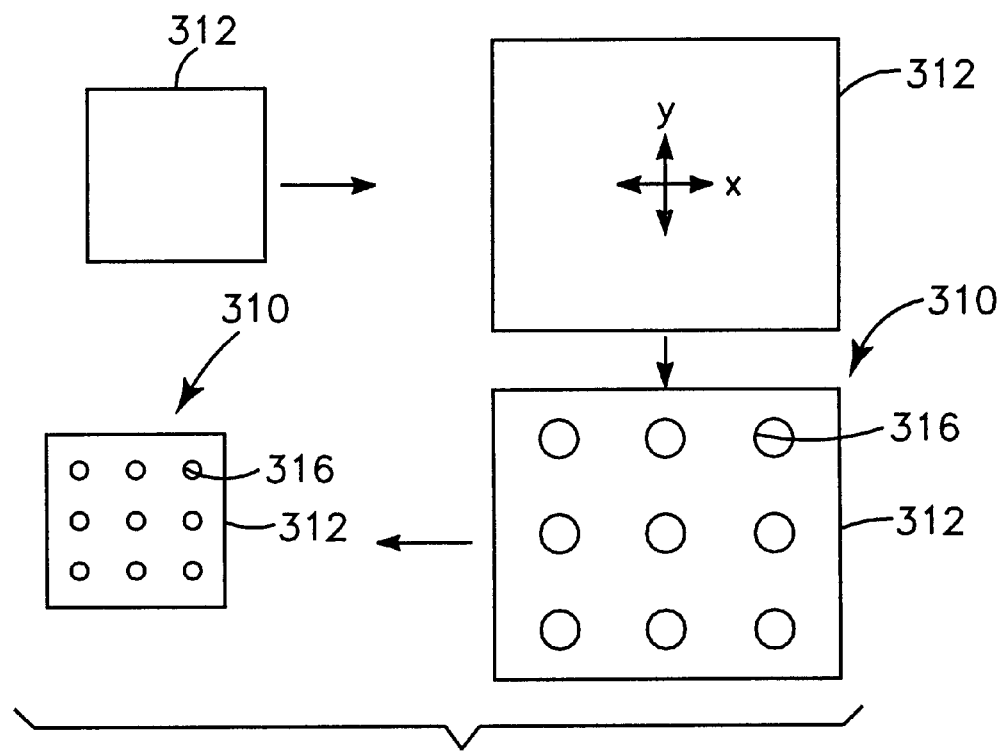
FIG. 9 depicts another illustrative method of the present invention.

Referring to FIG. 9, another illustrative method according to the present invention is depicted. This method begins with an elastomeric substrate 312 that is stretched in the "x" and/or "y" direction and retained in the stretched condition. Processes for stretching an elastomeric material may include using a tentering device or stretching the material over a frame or mandrel. In most applications, uniform stretching of the substrate in both the "x" and "y" configuration is preferred so that reactants may be affixed or bound to the substrate 312 in parallel rows to form binding sites 316 on the array 310. However, other patterns of reactants/binding sites 316 may be desired, such as, for example, a fan shape array of reactants. Accordingly, the extent and pattern of stretching may be dependent on the desired shape of the finished array 310.

Referring back to, e.g., FIG. 3, reactants are introduced to the array 10 (preferably to the major surface) for affixation to create binding sites 16. The modes of affixation may include, without limitation, physical affixation, such as for example, physically entrapping the reactants within the substrate or layers/coatings thereon. With reference to FIG. 1, in a preferred embodiment of the present invention, reactants can be introduced to be affixed to the array 10 using a linking agent coating 15. The linking agent coating 15 may be provided on the array 10 using any of the methods described above.

Regardless of how the reactants 22 are affixed to the array 10, any number of processes known in the art may be used to introduce the reactants 22 to the array 10, including on-chip or off-chip synthesis. Using such techniques, the methods of the present invention can be used to increase array site density by, e.g., greater than a factor of 20. For the purpose of high throughput manufacturing, however, sophisticated miniaturized tools and methods, such as those used in on-chip and off-chip synthesis, may not be desired. Accordingly, large quantities of reactants may be deposited in a short period of time because the initial substrate size is relatively large, such as a substrate having a 4 cm×4 cm surface. The resulting binding sites formed may be relatively large, with areas, for example, of approximately 0.25 mm$^2$ to 1.0 mm$^2$ being suitable for use in the present invention. For example, solutions containing the reactants 22 to be affixed may be simultaneously introduced by arrays of capillary tubes, by arrayed pipetting devices, or by an array of posts designed to transfer liquid droplets from a tray of reservoirs.

It is preferred that the reactants be introduced to the array in a known pattern for purposes of registration. The initial starting position of the reactant should be known in order to correlate this position with the final position once the substrate size has been reduced to the dimension which will be employed in conducting the assay. Each binding site may include a dye or other indicator to assist in the correlation between initial starting point and the end point. The indicator, e.g., a dye, preferably has a different detection mode, e.g., light source, wavelength, etc., than the dye or indicator used for purposes of detecting binding events on the array 10.

Referring now to, e.g., FIGS. 8 and 9, after affixation of the reactant(s) to the arrays, the substrate is relaxed to reduce its surface area. Relaxation may include, e.g., the application of energy, such as heat, in the case of oriented films (see FIG. 8). Alternatively, relaxation may include release of a stretching force in the case of an elastomeric substrate (see FIG. 9).

The number of binding sites on the arrays before and after size reduction is equivalent. However, the increase in density of reactants, binding sites and linking agents, if present, may be dramatic. The arrays manufactured in accordance with the methods of the present invention are capable of, e.g., binding site densities of over 1,000 per $cm^2$. A preferred density is at least 25,000 per $cm^2$ and a most preferred density is over 60,000 per $cm^2$. Accordingly, the methods of the present invention permit the manufacturer to increase the density of binding sites from the initial affixation of reactants to the size reduced state by fairly substantial factors, such as 4, 10, and even over 20.

The area of each binding site can be reduced by these same factors, thereby creating an increased density of reactant at each site. This increased density of reactant is advantageous where a more intense electromagnetic signal for detection is desired when conducting an assay, for example when fluorescent, absorbent, or chemiluminescent species are used as reporters.

With respect to oriented film substrates, the surface area reduction is preferably effected by the application of heat. However, any mode that results in the reduction of the surface area of the major surface of the substrate may be sufficient for purposes of this invention. Preferably, the mode of size alteration, such as the application of heat, does not substantially impair the integrity of any components, e.g., mask layer, linking agent coating, reactants, etc., as well as the activity of the reactants. For example, fairly high temperatures may be employed to shrink a substrate having oligonucleotides affixed thereto (approximately 150 degrees Celsius) without destroying the ability for subsequent DNA hybridization to occur with the oligonucleotides.

With respect to elastomeric material substrates, the surface area reduction may be achieved by releasing the force that restrains the material in the stretched condition. The substrate may be subsequently treated to hold the substrate in the reduced format. For example, a backing or other physical structure may be affixed to the substrate to hold it in the size altered format.

After size alteration of the substrate, the substrate, if desired, may be treated to retain the substrate in the reduced surface area state. Such treatment may include cross-linking the substrate. Alternatively, physical modes may be used, such as affixing a dimensionally stable backing to the substrate.

The arrays manufactured by the methods of the present invention are useful in a variety of applications, including without limitation, gene sequencing, monitoring gene expression, gene mapping, disease detection, drug discovery, and combinatorial chemistry.

One skilled in the art will recognize that the methods of the present invention may be adapted for use on a mass production basis.

Alternative Embodiments

Figure 10:
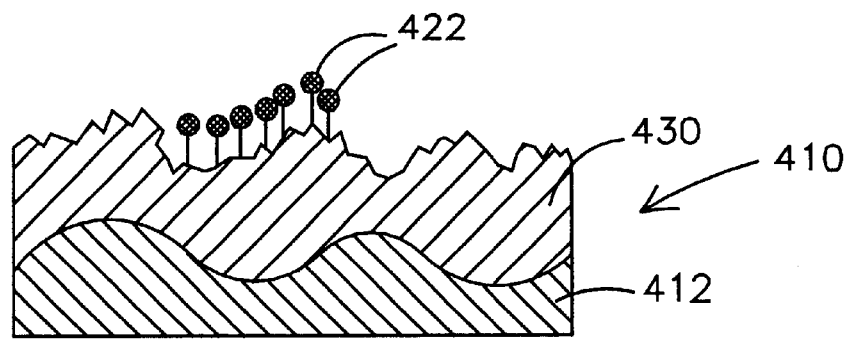
FIG. 10 is a cross-sectional view of a portion of an alternative array manufactured in accordance with the methods of the present invention.

Although the arrays described above include a mask layer that is distinct from the linking agent coating, it may also be possible to combine the functions of the mask layer with the functions of the linking agent coating. Referring to FIG. 10, a cross-sectional view of a portion of an array 410, illustrated in its pre-relaxation state, includes a coating 430 that combines the optical properties of the mask layer as described above, with the linking agents required to bind reactants 422 to the surface of the array 410.

One example of such a combination masking/linking agent coating 430 could include an ink in combination with suitable linking agents that is deposited/formed on the substrate 412.

Figure 11:
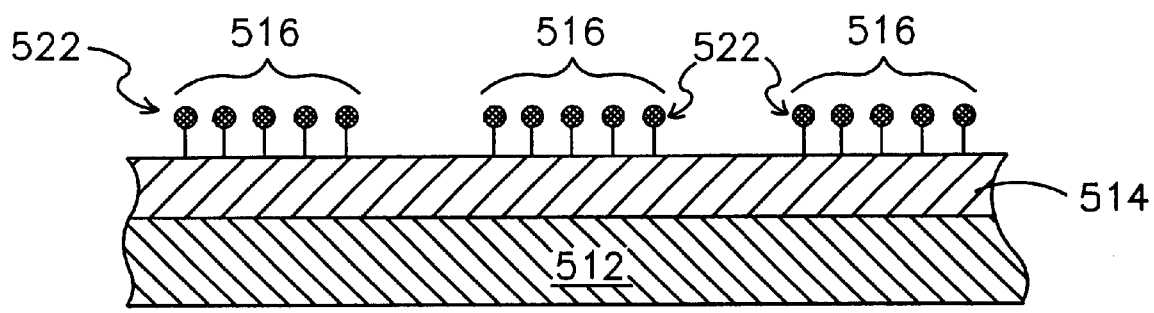
FIG. 11 is a cross-sectional view, before relaxation, of a portion of another array manufactured in accordance with the present invention.
Figure 12:
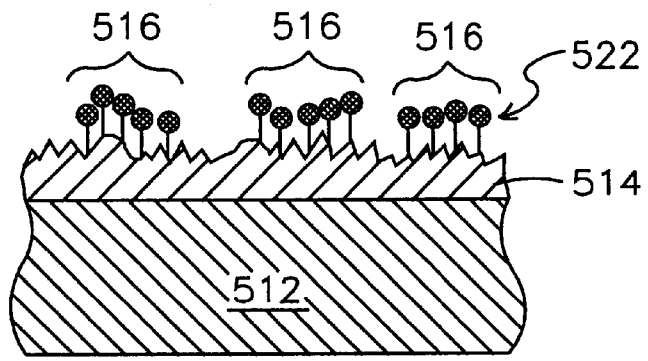
FIG. 12 is a cross-sectional view of the array of FIG. 11 after relaxation of the substrate.

In yet another alternative, arrays may be manufactured according to the present invention may eliminate the need for a linking agent and linking agent coating altogether. One such example of an array is illustrated in FIGS. 11 and 12, in which a substrate 512 includes a mask layer 514 including gold. Such a gold layer may be used to directly attach reactants 522 to binding sites 516 by covalently attaching oligonucleotides to the gold in mask layer 514 when the oligonucleotides include sulphohydryl (—SH) groups. FIG. 11 illustrates such a system before relaxation. FIG. 12 illustrates the system after relaxation of the substrate 512, with subsequent increase in the density of the binding sites 516, as well as increases in the density of the reactants 522 in each of the binding sites.

Substrate with Undulated Mask Layer

Figure 13:
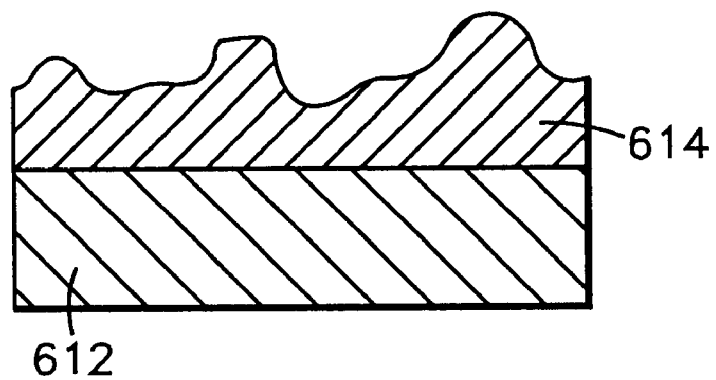
FIG. 13 is a cross-sectional view, after relaxation, of a portion of an article manufactured in accordance with the present invention

Although the use of a substrate including a mask layer that provides an undulated surface after relaxation of the underlying substrate may provide significant advantages in connection with high-density arrays as discussed herein, it will be recognized that structures including only a relaxed substrate and undulated metal-containing layer may be useful in applications other than high-density arrays as described above. Referring now to FIG. 13, an example of such an article is illustrated which includes a substrate 612 with a metal-containing layer 614 that provides an increased topographical surface area. As discussed above, relaxation of the substrate 612 can provide significant increases in surface area that may be comparable to or better than other techniques used to achieve increased surface area on articles.

As a result, it should be understood that the structure of a relaxed polymeric substrate with an undulated metal-containing layer thereon and methods of forming the same be employed in many other contexts and should not be limited to the specific applications otherwise described herein.

TEST METHODS

Optical Density

The optical densities described herein were determined using a Macbeth TR927 Instrument (Kollmorgen Corporation, Newburgh, N.Y., USA). All readings were taken using dry samples with the black filter setting on the instrument.

EXAMPLES

The following examples have been selected merely to further illustrate features, advantages, and other details of the invention. It is to be expressly understood, however, that while the examples serve this purpose, the particular ingredients and amounts used as well as other conditions and details are not to be construed in a manner that would unduly limit the scope of this invention.

Examples 1–16

A variety of constructions were manufactured and tested to determine optical density before and after relaxation of the substrate. In addition, intensity measurements were obtained from the samples for a single wavelength of light after excitation at an appropriate wavelength of light. These comparative intensity measurements illustrate the fluorescence and light scatter resulting in all the tested constructions. These readings are reported as average values from an approximate 1 cm$^2$ area of the samples before hydration. The optical density and intensity measurements are reported in Table 1 below. In addition, the examples are further described below.

Generally, examples 1, 8, and 16 are provided as controls in which no mask layer is used. Examples 6, 11, and 12 illustrate the use of an ink-based mask layer. Examples 2–5, 9, and 10 illustrate the use of metal-containing mask layers. Examples 7 and 13–15 illustrate inks including linking agents pre-mixed therein.

With the exception of those examples including glass slides, all of the samples using a polyethylene shrink film substrate were relaxed by placing the sample on a surface heated to a temperature of 155° C. The surface was covered with a silicone film (0.040", 3M Company, St. Paul, Minn.) to prevent adhesion of the shrink film to the heated surface. The samples were flipped during heating to provide for more even heat distribution on both sides of the samples. After observable shrinkage ceased (typically after 2–3 minutes), the samples were removed from the heated surface and cooled between two glass microscope slides. After cooling the samples were removed from between the slides and analyzed.

TABLE 1

| Example | Pre-relax Optical Density | Post-relax Optical Density | Scanner Intensity Post-relax |
|---|---|---|---|
| 1 | 0.03 | 0.16 | 3987 |
| 2 | 0.18 | 2.1 | 38 |
| 3 | 0.21 | 2.0 | 39 |
| 4 | 0.24 | 2.0 | 72 |
| 5 | 0.34 | 1.9 | 50 |
| 6 | 0.26 | 2.9 | 447 |
| 7 | 0.09 | 1.5 | 65 |
| 8 | 0.03 | 0.4 | 19017 |
| 9 | 0.16 | 2.2 | 146 |
| 10 | 0.17 | 2.1 | 176 |
| 11 | 0.24 | 2.8 | 517 |
| 12 | 0.26 | 2.8 | 661 |
| 13 | 0.12 | 2.0 | 3467 |
| 14 | 0.20 | 2.5 | 1118 |
| 15 | 0.12 | 1.9 | 3292 |
| 16 | 0 | 0 | 40 |

Example 1 (Comparative)

An uncoated polyethylene shrink film (Cryovac D955, 1 mil thick) from Sealed Air Corporation (Simpsonville, S.C., USA) was used to provide a control for comparisons in background reduction before any coatings are deposited on the film.

Example 2

This example includes a layer of titanium on the polyethylene shrink film of example 1. The titanium layer was coated using standard sputtering methods with a web coater manufactured by Mill Lane Engineering (Lowell, Mass., USA).

Example 3

The polyethylene shrink film of example 1 was plasma treated in an oxygen environment followed by coating with chromium (Cr) using a vapor deposition method in which the metal is vaporized by electron beam evaporation out of a graphite crucible insert made by Denton Vacuum (Moorestown, N.J., (USA).

Example 4

The polyethylene shrink film of example 1 was plasma treated in an oxygen environment followed by coating with tin (Sn) using a vapor deposition method in which the metal is vaporized by electron beam evaporation out of a graphite crucible insert made by Denton Vacuum.

Example 5

The polyethylene shrink film of example 1 was plasma treated in an oxygen environment followed by coating with gold (Au) using a vapor deposition method in which the metal is vaporized by electron beam evaporation out of a graphite crucible insert made by Denton Vacuum.

Example 6

The polyethylene shrink film of example 1 was coated using a standard micro reverse gravure coating method with a 10:1 dilute solution of CFB-Neutral Black Ink-34-098 from Cavanagh Corporation (Flemington, N.J., USA) in methylethylketone (MEK) from Aldrich (Milwaukee, Wis., USA). The ink was cured with ultraviolet energy at 365 nm under a nitrogen purged atmosphere using a chilled roll.

Example 7

An ink containing 7% Nitrocellulose—168420 from Videojet Systems International, Inc. (Wood Dale, Ill., USA) was coated on the polyethylene shrink film of example 1 using a standard micro reverse gravure coating method.

Example 8 (Comparative)

The polyethylene shrink film of example 1 was coated with 1.5% azlactone copolymer solution in MEK that was crosslinked with 10% ethylenediamine (10% EDA) from Aldrich using a standard extrusion coating method. This coated substrate was further coated with a 0.3% solution of linear polyethyleneimine (linear PEI) from Aldrich in methanol obtained from Aldrich.

Example 9

The titanium-coated polyethylene shrink film of example 2 was coated with 1.5% azlactone copolymer solution in MEK that was crosslinked with 10% EDA using a standard extrusion coating method. This coated substrate was further coated with a 0.3% solution of linear PEI in methanol.

Example 10

The titanium-coated polyethylene shrink film of example 2 was coated with a 0.15% wt. solution of a high molecular weight PEI obtained from Aldrich in methanol using a standard extrusion coating method.

Example 11

The construction of example 6 was coated with 1.5% azlactone copolymer solution in MEK that was crosslinked with 10% EDA using a standard extrusion coating method. This coated substrate was further coated with a 0.3% solution of linear PEI in methanol.

Example 12

The construction of example 6 was coated with a 0.15% wt. solution of a high molecular weight PEI in methanol using a standard extrusion coating method.

Example 13

A 0.45% wt. solution of linear PEI was prepared in a 10:1 dilute solution of the 34-098 Cavanagh ink of example 6 in MEK. The polyethylene shrink film of example 1 was coated using a standard micro reverse gravure coating method with this solution and cured with ultraviolet energy at 365 nm under a nitrogen purged atmosphere using a chilled roll.

Example 14

A 1.8% wt. solution of azlactone copolymer was prepared in a 10:1 dilute solution of the 34-098 Cavanagh ink of example 6 in MEK. This solution was coated on the polyethylene shrink film of example 1 using a standard micro reverse gravure method and cured with ultraviolet energy at 365 nm under a nitrogen purged atmosphere. On this pre-coated surface, a 0.15% wt. solution of a high molecular weight PEI in methanol was coated using a standard extrusion coating method.

Example 15

The construction of example 13 was coated with 1.5% azlactone copolymer solution in MEK that was crosslinked with 10% EDA using a standard extrusion coating method. This coated substrate was further coated with a 0.3% solution of linear PEI in methanol.

Example 16 (Comparative)

A silica glass microscope slide was used to obtain optical density (OD) and scanned intensity measurements.

The preceding specific embodiments are illustrative of the practice of the invention. This invention may be suitably practiced in the absence of any element or item not specifically described in this document. The complete disclosures of all patents, patent applications, and publications identified herein are incorporated into this document by reference as if individually incorporated in total.

Various modifications and alterations of this invention will become apparent to those skilled in the art without departing from the scope of this invention, and it should be understood that this invention is not to be unduly limited to illustrative embodiments set forth herein, but is to be controlled by the limitations set forth in the claims and any equivalents to those limitations.

What is claimed is:

1. An array comprising:
    a polymeric substrate comprising a relaxed oriented film or a relaxed elastomeric material, the substrate having a surface; and
    a mask layer on said surface comprising at least one metal or metallic compound, wherein the layer having a projected surface area and a topographical surface area wherein the topographical surface area is greater than the projected surface area; and
    at least one reactant affixed to one or more binding sites within the mask layer.

2. The array of claim 1 wherein the mask layer comprises one or more metals, one or more metallic compounds, or combinations of one or metals and one or more metallic compounds.

3. The array of claim 1, wherein the topographical surface area is at least two times greater than the projected surface area.

4. The array of claim 1, wherein the topographical surface area is at least five times greater than the projected surface area.

5. The array of claim 1, wherein the topographical surface area is at least fifteen times greater than the projected surface area.

6. The ray of claim 1, wherein the substrate is derived from a heat shrink film starting material.

7. The array of claim 6, wherein the heat shrink film comprises biaxially oriented low density polyethylene, biaxially oriented linear low density polyethylene, biaxially oriented ultra low density polyethylene, or biaxially oriented ethylene vinyl acetate.

8. The array of claim 1 wherein the binding sites are provided by one or more metals, one or more metallic compounds, or combinations of one or more metals and one or more metallic compounds.

9. The array of claim 1 wherein the mask layer has an optical density of about 0.5 or greater for light of a selected wavelength.

10. The ray of claim 9, wherein the mask layer has an optical density of about 1.0 or greater for light of a selected wavelength.

11. The array of claim 1, wherein the reactant comprises one or more amino acids, one or more nucleic acids, one or more proteins, one or more carbohydrates, or a combination thereof.

12. The array of claim 1 wherein the reactant comprises one or more oligonucleotides.

13. The array of claim 1 wherein the reactant comprises cDNA.

\* \* \* \* \*

UNITED STATES PATENT AND TRADEMARK OFFICE
CERTIFICATE OF CORRECTION

PATENT NO.    : 6,593,089 B2                                                        Page 1 of 1
DATED         : July 15, 2003
INVENTOR(S)   : Patil, Sanjay L.

It is certified that error appears in the above-identified patent and that said Letters Patent is hereby corrected as shown below:

Column 7,
Line 38, delete "layer should not" and insert in place thereof -- layer 14 should not --.
Line 64, delete "effect," and insert in place thereof -- in effect, --.

Column 20,
Line 23, delete "ray" and insert in place thereof -- array --.

Signed and Sealed this

Twenty-eighth Day of October, 2003

JAMES E. ROGAN
*Director of the United States Patent and Trademark Office*

UNITED STATES PATENT AND TRADEMARK OFFICE
CERTIFICATE OF CORRECTION

PATENT NO.         : 6,593,089 B2                                         Page 1 of 1
APPLICATION NO. : 09/909585
DATED                : July 15, 2003
INVENTOR(S)       : Sanjay L Patil It is certified that error appears in the above-identified patent and that said Letters Patent is hereby corrected as shown below:

Col. 1 line 9 insert

--GOVERNMENT NOTICE

This invention was made with government support under Project Number
95-08-0006 awarded by the National Institute of Standards and Technology. The
government has certain rights in the invention.--

Signed and Sealed this

Thirtieth Day of November, 2010

David J. Kappos
*Director of the United States Patent and Trademark Office*